US012802430B2

(12) United States Patent
Kurz

(10) Patent No.: US 12,802,430 B2
(45) Date of Patent: Nov. 17, 2026

(54) CONTROLLER FOR PROVIDING A CLASSIFICATION OF SENSOR DATA FOR A MOTOR VEHICLE BY MEANS OF AN OPTICAL NEURAL NETWORK, AND METHOD FOR OPERATING THE CONTROLLER

(71) Applicant: Volkswagen Aktiengesellschaft, Wolfsburg (DE)

(72) Inventor: Heiko Gustav Kurz, Hannover (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 216 days.

(21) Appl. No.: 18/723,311

(22) PCT Filed: Dec. 7, 2022

(86) PCT No.: PCT/EP2022/084882
§ 371 (c)(1),
(2) Date: Jun. 21, 2024

(87) PCT Pub. No.: WO2023/126140
PCT Pub. Date: Jul. 6, 2023

(65) Prior Publication Data

US 2025/0061698 A1 Feb. 20, 2025

(30) Foreign Application Priority Data

Dec. 28, 2021 (DE) ..................... 10 2021 006 379.1
Jan. 14, 2022 (DE) ..................... 10 2022 100 836.3

(51) Int. Cl.
*G06K 9/00* (2022.01)
*G06V 10/82* (2022.01)
*G06V 20/56* (2022.01)

(52) U.S. Cl.
CPC .............. *G06V 10/82* (2022.01); *G06V 20/56* (2022.01)

(58) Field of Classification Search
CPC ........................... G06N 3/0675; G06V 10/454
See application file for complete search history.

(56) References Cited

U.S. PATENT DOCUMENTS

2016/0004958 A1 1/2016 Byng
2020/0327403 A1 10/2020 Du et al.
(Continued)

FOREIGN PATENT DOCUMENTS

CN 110401492 B 8/2020
CN 111767678 A 10/2020
(Continued)

OTHER PUBLICATIONS

Zuo, Y., Li, B., Zhao, Y., Jiang, Y., Chen, Y. C., Chen, P., . . . & Du, S. (2019). All-optical neural network with nonlinear activation functions. Optica, 6(9), 1132-1137. (Year: 2019).*
(Continued)

*Primary Examiner* — Molly Wilburn
*Assistant Examiner* — Aidan Keup
(74) *Attorney, Agent, or Firm* — Peter Zura; LOZA & LOZA, LLP

(57) ABSTRACT

A controller for providing classification of sensor data for a motor vehicle using an optical neural network and a method for operating the controller are disclosed. The controller includes an optical neural network configured to provide optically coded sensor data and evaluate the data using multiple optical neurons with electromagnetically induced transparency properties. The evaluation results in optically coded classification information, which is converted into electronically coded classification information by a conversion device within the controller. The electronically coded
(Continued)

classification information is then provided for use by the motor vehicle.

20 Claims, 5 Drawing Sheets

(56) References Cited

U.S. PATENT DOCUMENTS

| | | | |
|---|---|---|---|
| 2021/0012184 A1 | 1/2021 | Rodrigues et al. | |
| 2021/0097378 A1 | 4/2021 | Rodrigues et al. | |
| 2021/0142170 A1 | 5/2021 | Ozcan et al. | |
| 2022/0097690 A1* | 3/2022 | Dede | G01C 21/3461 |

FOREIGN PATENT DOCUMENTS

| | | |
|---|---|---|
| JP | 2015012528 A | 1/2015 |
| WO | 2014169321 A1 | 10/2014 |
| WO | 2020140147 A1 | 7/2020 |

OTHER PUBLICATIONS

PCT/EP2022/084882. International Search Report (Feb. 16, 2023).

Priority DE Application No. 102022100836.3. Office Action (Aug. 9, 2022).

De Marinis et al. "Photonic Neural Networks: A Survey" IEEE Access. DOI: 10.1109/Access.2019.2957245. (Dec. 2, 2019).

Demertzis et al. "Comprehensive Survey on Nanophotonics Neural Networks". arxiv.org, Cornell University Library, 201. Olin Library Cornell University Ithaca, NY 14853 (Oct. 30, 2021).

Hara et al., "Surface operating Optoelectronic devices and Applications to Optical Parallel Processing." Electronics & Communications in Japan, Part II, vol. 77, No. 10, (Oct. 1994).

Optalysis: "Self-driving vehicles and Fourier-optical computing: A way forward?." Blogartikel auf medium.com, May 3, 2021, 1-10. https://medium.com/optalysys/selfdriving-vehicles-and-fourier-optical-computing-a-way-forward-c2eb8df33754 (downloaded Sep. 8, 2022).

Ryou et al. "Free-space optical neural network based on thermal atomic nonlinearity". arxiv.org, Cornell University Library, 201, Olin Library Cornell University Ithaca, NY 14853 (Feb. 8, 2021).

Sadeghzadeh et al: "Free-Space Optical Neural Network Based on Optical Nonlinearity and Pooling Operations", IEEE Access, IEEE, USA, DOI: 10.1109/Access.2021.3123230 (Oct. 26, 2021).

Shastri et al. "Photonics for artificial intelligence and neuromorphic computing." Nature Photonics, vol. 15, pp. 102-114 (Feb. 2021).

Sunny et al. "A survey on silicon photonics for deep learning." ACM Journal of Emerging Technologies in Computing System, vol. 17, No. 4, Article 61 (Jun. 2021).

Wikipedia "Autler-Townes effect." https://en.wikipedia.org/w/index.php?title=Autler %E2%80%93Townes_effect&oldid=1049913227 (downloaded Sep. 8, 2022).

Xu et al. "A survey of approaches for implementing optical neural networks". Optics & Laser Technology Bd. 136 (Dec. 4, 2020).

* cited by examiner

CONTROLLER FOR PROVIDING A CLASSIFICATION OF SENSOR DATA FOR A MOTOR VEHICLE BY MEANS OF AN OPTICAL NEURAL NETWORK, AND METHOD FOR OPERATING THE CONTROLLER

RELATED APPLICATIONS

The present application claims priority to International Patent App. No. PCT/EP2022/084882 to Heiko Gustav Kurz, titled "Controller For Providing A Classification Of Sensor Data For A Motor Vehicle By Means Of An Optical Neural Network, And Method For Operating A Controller", filed Dec. 7, 2022, which claims priority to German Patent App. No. 10 2021 006 379.1, filed on Dec. 28, 2021, and German Patent App. No. 10 2022 100 836.3, filed on Jan. 14, 2022, the contents of each being incorporated by reference in their entirety herein.

TECHNICAL FIELD

The present disclosure relates to a control device for providing a classification of sensor data for a motor vehicle by means of an optical neural network. The present disclosure furthermore relates to a motor vehicle comprising such a control device and to a method for operating such a control device.

BACKGROUND

A motor vehicle can be designed for automated or at least semi-automated driving. For this purpose, the motor vehicle comprises a processor device, for example, which is designed to control a longitudinal and/or lateral guidance of the motor vehicle, for example by means of an activation of a drive device, a brake system and/or a steering system of the motor vehicle. Reliably detecting and evaluating surroundings of the motor vehicle are indispensable for automated or at least semi-automated driving, that is, the motor vehicle should be provided with reliable sensing of the environment. For this purpose, the surroundings of the motor vehicle, which can alternatively be referred to as the environment of the motor vehicle, are detected by means of at least one sensor device, for example by means of a radar device, a LIDAR device and/or a camera, and at least one object in the surroundings detected in this way is classified. In other words, it is ascertained which class of objects the detected object can be assigned to. During the classification, it is thus checked, for example, whether the detected object is another road user, such as another motor vehicle or a bicycle, a person, a road surface and/or an infrastructure element, such as a building. Such a classification can be carried out, for example, by means of a neural network (NN) or artificial neural network (ANN), which was previously trained to recognize objects of different classes of objects.

US 2020/0327403 A1 shows an optical neural network which provides layers of a neural network by means of light beams and optical components, the network comprising an input layer, zero or more intermediate layers, and an output layer. An optical non-linear operation is implemented by means of a non-linear optical medium having electromagnetically induced transparency characteristics.

An optical neural network is also described in the scientific publication "All-optical neural network with nonlinear activation functions" by Ying Zuo, Bohan Li, Yujun Zhao, Yue Jiang, You-Chiuan Chen, Peng Chen, Gyu-Boong Jo, Junwei Liu und Shengwang Du (Optica, Vol. 6, No. 9, September 2019, pages 1132-1137), according to which laser-cooled rubidium 85 isotopes are excited in a two-dimensional magneto-optical trap (MOT) by means of a probe laser and a coupling laser so as to realize a non-linear optical activation function having electromagnetically induced transparency characteristics.

SUMMARY

Aspects of the present disclosure are directed to providing solutions by which sensor data for a motor vehicle can be classified particularly quickly.

Aspects of the present disclosure are described in the features recited in the independent claims, found below. Further aspects are described in the features recited in the dependent claims.

In some examples, a control device is disclosed for providing a classification of sensor data for a motor vehicle via an optical neural network (NN). The control device comprises the optical NN. The NN can alternatively be referred to as an artificial neural network (ANN).

The present disclosure is based on the finding that it is indispensable for an automated or at least semi-automated driving function of a motor vehicle to comprehensively detect surroundings of the motor vehicle over 360 degrees as well as in three dimensions (360° 3D environment detection) so that all static and/or dynamic objects in the surroundings can be detected and subsequently classified. The camera in particular plays a substantial role in the redundant, robust detection of the surroundings since this sensor type is able to precisely measure angles in the surroundings and can be used to classify the surroundings.

However, the processing and classification of camera images recorded using the camera are computationally intensive and architecturally complex. The 360° 3D environment detection in particular can be problematic, since numerous individual images must be classified and processed, and a required computing effort is thus typically high compared to an evaluation of other sensor data. A high-performance NN or ANN offers the option of classifying camera images and/or data of another sensor device of the motor vehicle, such as of a radar device and/or LIDAR device, with refresh rates of several hertz, which can, for example, range between more than 0 hertz and less than 10 hertz.

For reliable environment detection with high resolving power, that is, which is in a desired resolving power range, in real time, however, this refresh rate is insufficient since modern camera systems operate with a refresh rate of 30 hertz. In addition, a data load rises with increasing resolving power of the camera images. A camera that is suitable for automobiles can, for example, have a resolution of 8 mega pixels or above. It is not possible to classify the camera images of this camera in the motor vehicle using the conventional NN in real time if numerous differing classes are to be distinguished. The limiting factor in the process is a speed of a processor or graphics processor that is used, which is typically thus far not sufficient even in the case of a high-performance computer to completely classify the high-resolution and numerous images per second in real time. The classification is necessary for an understanding of the scene in the surroundings so as to be able to determine and carry out an automated or at least semi-automated driving maneuver for the motor vehicle in accordance with the surroundings. An incomplete and/or faulty classification is undesirable for the use of the automated or at least semi-automated driving function and/or an automated or at least semi-automated driver assistance system.

In some examples, a motor vehicle is disclosed comprising a control device as described herein. The exemplary embodiments described in connection with the control device, both individually and in combination with one another, apply accordingly, where applicable, to the motor vehicle in the present disclosure. The motor vehicle is, for example, a passenger car, a truck, a bus, a motorcycle and/or a moped.

In some examples, the motor vehicle comprises at least one sensor device including a control unit. The control unit is connected via at least one optical fiber connection to the communication interface of the control device. The control unit of the sensor device is configured to transmit the sensor data detected by means of the sensor device to the control device via the at least one optical fiber connection. In other words, the control device is configured to receive the sensor data detected via the sensor device from the control unit via the at least one optical fiber connection. The optical fiber connection can, for example, be formed of polymer optical fibers (POF, also plastic optical fiber). In other words, a third optical waveguide can be arranged between the control unit and the control device. This optical waveguide is preferably made of plastic material and is used to transmit the sensor data to the control device. In this way, the internal communication in the motor vehicle between the sensor device and the control device by way of the optical NN is made possible reliably and quickly.

In some examples, a method is disclosed for operating a control device for providing a classification of sensor data for a motor vehicle via an optical neural network. The method comprises: providing optically coded sensor data; evaluating the provided optically coded sensor data by means of an optical neural network, which includes multiple optical neurons having electromagnetically induced transparency characteristics, wherein optically coded classification information describing the classification of the sensor data is provided as a result of the evaluation by means of an evaluation device of the optical neural network; converting the optically coded classification information into electronically coded classification information by means of a conversion device; and providing the electronically coded information for the motor vehicle.

The exemplary embodiments described in connection with the control device, both individually and in combination with one another, apply accordingly, where applicable, to the methods disclosed herein. The methods can be at least partly regarded as a computer-implemented method.

The present disclosure also encompasses the combinations of the features of the exemplary embodiments described herein.

BRIEF DESCRIPTION OF THE DRAWINGS

Exemplary embodiments of the invention are described hereafter. In the drawings.

DETAILED DESCRIPTION

Figure 1:
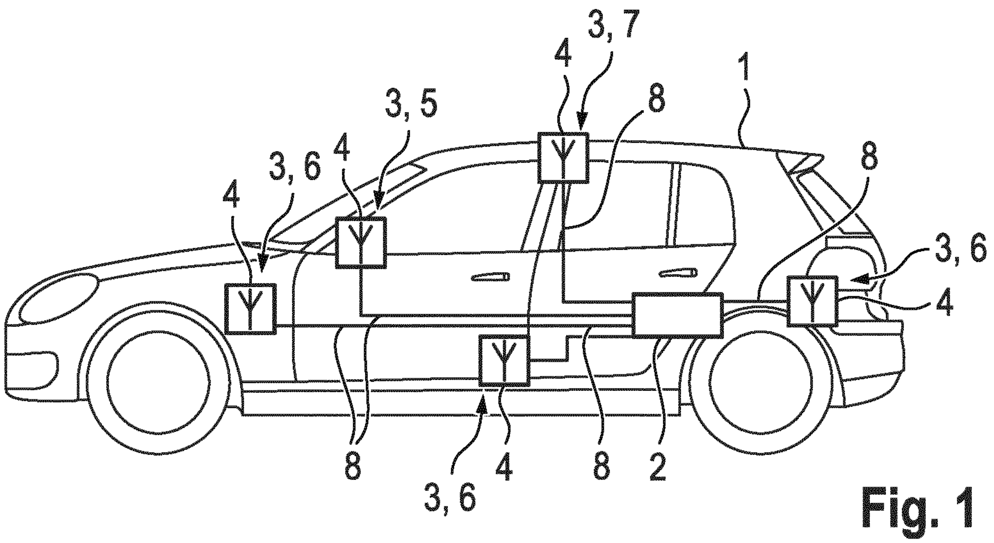
FIG. 1 shows a schematic side view of a motor vehicle comprising a control device and multiple sensor devices, according to some aspects of the present disclosure.

The exemplary embodiments described hereafter are preferred exemplary embodiments. In the exemplary embodiments, the described components in each case represent individual features that are to be considered independently of one another and which each also refine the invention independently of one another and, as a result, shall also be considered to be an integral part of the present disclosure, either individually or in a combination other than the one shown. Furthermore, the described exemplary embodiments can also be supplemented with additional of the above-described features of the present disclosure.

In the figures, functionally equivalent elements are each denoted by the same reference numerals.

In the context of automated or semi-automated driving functions, a neural network (NN) may be used for classifying the surrounding environment. Sensor data are electronically transmitted to multiple neurons within the NN using weights. Each neuron performs an arithmetic operation via a linear or non-linear response function. The output signal from a neuron in one layer, which is passed to neurons in the subsequent layer, can be represented by a sigmoid function of the sum of weighted input signals. The sigmoid function is an example of a non-linear response function:

$$a_1^1 = \sigma\left(\sum \omega_i a_i^0\right)$$

Here, $a_1^1$ is a neuron of a layer of multiple neurons, $\omega i$ is the weight, $a_i^0$ is the neurons, and $\sigma$ is the sigmoid function. The NN thus forms the following function:

$$f(a^0, \ldots, a^n) = (y_0, \ldots, y_k)$$

Here, n and k are natural numbers, $a^i$ is individual neurons (for i=0 to i=n), and $y^i$ is the function values (for i=0 to i=k) which are output as class information. The output signals of the neurons correspond to classification results, indicating the class of objects represented in specific regions of an image. For example, the NN can classify objects within regions of a camera image, where the image serves as sensor data processed by the NN.

When a neural network (NN) is implemented on a conventional computer architecture, slow processing of the data generally occurs, preventing real-time classification of high-resolution camera images or other sensor data.

To classify sensor data more quickly than a conventional NN, an optical NN should be used. This is because using atomic ensembles as neurons in an NN enables high-precision quantum control of electromagnetic radiation. Each atomic ensemble, acting as a neuron in the optical NN, can be designed as a non-linear optical medium. It is crucial that this non-linear optical medium has electromagnetically induced transparency (EIT) characteristics. The non-linear optical medium can be designed as a quantum structure, for example. By leveraging the EIT effect, at least one electromagnetic atomic state of the non-linear optical medium serving as an optical neuron can be utilized.

The control device is designed to provide optically coded sensor data. The sensor data can be detected by a sensor device of the motor vehicle and provided to the control device, for example, by means of a control unit of the sensor device, particularly via a motor vehicle-external communication link. Alternatively, or in addition, the sensor data can be provided by an external device, such as another motor vehicle, a server device, and/or an infrastructure device. The sensor data can then be wirelessly transmitted to the motor vehicle, for example, via a vehicle-to-vehicle connection and/or a vehicle-to-infrastructure connection. Examples of sensor data include camera data from a vehicle's front, rear, and/or side cameras, as well as radar data from a radar device and LIDAR data from a LIDAR device (LIDAR denoting "light detection and ranging").

The control device is further designed to evaluate the provided optically coded sensor data using the optical NN. The optical NN comprises multiple optical neurons with EIT characteristics. The control device is also designed to provide optically coded classification information as the result of this evaluation, using an evaluation device of the optical NN. The optically coded classification information describes the classification of the sensor data and includes data from which the classification can be derived. The evaluation device, a central unit of the control device, evaluates the data provided by all the optical neurons of the optical NN and determines the optically coded classification information for the sensor data. For example, the optically coded classification information describes, for each image pixel of a camera image serving as sensor data, the class of the object to which the pixel is assigned. Object classes may include roadway, roadway marking, vehicle, pedestrian, vegetation, and/or infrastructure element.

The control device includes a conversion device to convert the optically coded classification information into electronically coded classification information. This process generates an electronic signal or information from the previously provided optical signal or information, without changing its content.

Thus, the electronically coded classification information also describes the classification of the sensor data determined by the optical NN. This electronically coded classification information can be evaluated by an electronic device, such as a processor device of the motor vehicle. The processor device can control the longitudinal and/or lateral guidance of the motor vehicle, for example, by activating a drive device, brake system, and/or steering system. The electronically coded classification information is suitable for use in automated or at least semi-automated driving functions and/or driver assistance systems.

The control device is designed to provide the electronically coded classification information for the motor vehicle. It is preferably a component of the motor vehicle, enabling the provision of electronically coded classification information to itself and/or to the processor device, which may be arranged separately. Provision can include transmitting the electronically coded classification information from the control device to another motor vehicle component, such as the processor device for the automated or at least semi-automated driving function or driver assistance system.

The optical NN is initially trained before being used to classify the sensor data. For this purpose, camera data of potential surroundings of a motor vehicle, preferably multiple camera images, are provided to the optical NN, which learns the various classes of objects described by the sensor data. Additionally, radar data and/or LIDAR data can be provided for training. These training data are preferably actual sensor data from the surroundings of the motor vehicle, detected by its sensor device. The training process can include a manual review of the optically coded classification information obtained by the optical NN. The optical NN is thus designed to classify sensor data by assigning at least one object described by the data to a class of objects. The training establishes a connection between typical sensor data and object classes in the motor vehicle's surroundings, which is stored in the evaluation unit of the control device for future applications.

Using the optical NN allows data transmission at the speed of light between individual neurons and enables rapid evaluation since optically coded data can be transmitted and processed quickly. Thus, the control device facilitates especially rapid classification of the sensor data for the motor vehicle, as opposed to using electronically coded data in conventional ANNs or NNs.

In some examples, the at least one optical neuron is formed of a non-linear optical medium, such as a quantum dot, quantum wire, quantum well, and/or a vapor cell. The vapor cell contains at least one atom and/or molecule with a predefined energy level, such as a Rydberg atom and/or a Bose-Einstein condensate, and may include highly excited atoms. The vapor cell can be filled with a gas or solution.

A quantum dot is a nanoscopic material structure made of semiconductor material, where charge carriers (electrons, holes) are restricted in movement in all three spatial directions, allowing only discrete energy values. The quantum dot behaves similarly to an atom, but its shape, size, and number of electrons can be influenced to adapt electronic and optical properties to predefined requirements. A quantum wire is a spatial potential structure where the movement of charge carriers is restricted to one dimension. A quantum well restricts a particle's movement in one spatial dimension, allowing only planar regions to be occupied, thus leading to discrete energy states. The non-linear optical medium represents a system subject to quantum confinement, as in the quantum dot, quantum wire, and/or quantum well.

As a result, coupled quantum mechanical states are used for the optical NN, present in at least one atom, highly excited atom, Rydberg atom, molecule, solution, and/or quantum confinement system, allowing at least one electromagnetic atomic state to be utilized as an optical neuron through EIT. Various design options are possible for the non-linear optical medium, which can all exhibit the EIT effect, making the optical neurons especially flexible in their design.

In some examples, the optical NN has at least one layer with multiple optical neurons, including an input layer, zero or more intermediate layers (hidden layers), and an output layer. Each layer may be understood as a column of multiple neurons. At least one first optical waveguide leads to each optical neuron, designed to transmit light in fibers made of quartz glass, polymeric optical fibers, semiconductor structures, or solid body waveguide structures. A probe laser beam from a probe laser and a coupling laser beam from a coupling laser can be coupled into the optical neuron via the first optical waveguide, with the probe and coupling lasers comprising the optical NN.

The task of the two lasers is based on the EIT effect, where the probe laser, probe laser beam, and coupling laser, coupling laser beam are irradiated on the non-linear optical medium, which can have energy states E0, E1, and E2. Applying the probe laser beam to the non-linear optical medium raises at least one electron of an atom from energy state E0 to E1. The coupling laser beam further raises the electron from E1 to E2, coupling the energy states E1 and E2, referred to as "coupled states" or "dressed states." The electron transitions from E0 to E2 by absorbing photons from both the probe and coupling lasers. If E2 is a metastable state, the medium becomes transparent to the probe laser when no electrons remain to absorb photons from it, resulting in a "dark state." Using the two lasers, the optical neuron, including the non-linear optical medium, can be excited to function as an optical NN due to its EIT characteristics. In some examples, the optical NN has two first optical waveguides for each neuron, with one for the probe laser beam and the other for the coupling laser beam, allowing irradiation from different directions.

At least one second optical waveguide leads away from each optical neuron, configured similarly to the first optical waveguide. The second optical waveguide leads to another optical neuron or directly to the evaluation device. The probe laser beam can be coupled into the second optical waveguide after passing through the optical neuron. Upon passing the optical neuron, the probe laser beam is coupled into each of the second optical waveguides. The probe laser beam arriving in the optical neuron via the first optical waveguide may or may not interact with at least one electron of the optical neuron, i.e., the non-linear optical medium. After the interaction or non-interaction, the probe laser beam is relayed through the second optical waveguide into which it has been coupled.

For each neuron of a first layer, a respective second optical waveguide is available to every individual neuron of the adjacent second layer. This respective optical waveguide serves as the first optical waveguide for the respective neuron of the second layer. In the case of the last layer, the output layer, each neuron is connected to the output device via the second optical waveguide. This ensures that the neurons of the multiple layers of the optical NN are interconnected, maintaining the typical structure of a conventional NN or ANN, where neurons in different layers influence one another.

In some examples, the optical NN is configured to set a frequency and/or wavelength of the probe laser and/or coupling laser based on the sensor data. Through neuron-specific selection of a parameter setting for the probe laser and/or coupling laser in the input layer of optical neurons, image pixel information of the sensor data can be delivered to the optical NN. The sensor data represent input information such as pixel values from a camera image, local values from radar data, and/or local values from LIDAR data. This enables each neuron of the input layer to assume a sensor data-specific raised energy state, which may differ from other neurons in the input layer. This sensor data-specific information is communicated to the neurons of subsequent layers because the probe laser beam, when coupled into the second optical waveguide, retains this information. This information can be derived from the transmission spectrum and/or absorption spectrum of the respective coupled probe laser beam. Ultimately, this configuration provides a reliably functioning optical NN.

In some examples, the optical NN is configured to evaluate a transmission spectrum and/or an absorption spectrum of the probe laser beam coupled into the second optical waveguide to provide optically coded classification information. Specifically, an extreme value of a frequency and/or amplitude of the transmission or absorption spectrum is evaluated. The extreme value could be a maximum of the frequency and/or amplitude. Additionally, a phase of the transmission or absorption spectrum can be evaluated. This evaluation can be carried out by the evaluation device. When the optical neuron, particularly the non-linear optical medium, is irradiated by the probe and coupling lasers, a minimum forms in the absorption spectrum of the probe laser beam once a predefined minimum time and/or intensity for the optical neuron has been exceeded. In this case, photons of the probe laser can pass through the optical neuron without interaction, propagating through the non-linear optical medium without interaction. This state of the optical neuron can be detected by monitoring the absorption and/or transmission spectrum of the probe laser. The spectra of the output layer are evaluated, and the resulting data provide the optically coded classification information.

In some examples, the optical NN comprises at least one optical modulator, preferably a dedicated optical modulator for each optical neuron. The optical modulator is configured to influence at least one property of the probe laser beam, such as amplitude, polarization, frequency, wavelength, and/or phase. The optical modulator can provide the optical weight of the optical NN by weighting these properties of the probe laser beam. This allows the probe laser beam received by a particular neuron to be adjusted in a sensor data-specific manner. The optical modulator can influence a row of optical neurons across multiple columns or layers, ensuring that image pixel information of the sensor data is pre-defined by the probe laser beam received by each neuron. Furthermore, the optical modulator can be used for data transmission to the evaluation device, and to implement the optical weight of the optical NN.

In some examples, the optical NN also comprises a radiation source configured to irradiate the optical neurons with electromagnetic radiation. This applies an external electromagnetic field to the respective optical neuron, causing the transmission spectrum of the probe laser beam coupled into the second optical waveguide to undergo splitting, utilizing the dynamic Stark effect. The electron in the optical neuron, raised to a higher energy state by the probe laser beam, is further excited by the electromagnetic radiation from energy state E2 to E3, causing the splitting of the transmission spectrum. The optical NN is configured to evaluate the split transmission spectrum to provide the optically coded classification information. Specifically, an extreme value and/or distance between two extreme values of a frequency and/or amplitude of the transmission spectrum is evaluated. The distance can be determined between two maxima, and a minimum between them can be evaluated regarding frequency and/or amplitude. Additionally, a phase of the transmission spectrum can be evaluated. The transmission spectrum is preferably examined in the frequency domain. An advantage of the applied external electromagnetic field is that it decreases the amplitude of transmitted radiation and, through time-resolved measurement of the transmission spectrum, allows reconstruction of the phase of the incident probe laser radiation.

As an alternative or in addition to the transmission spectrum, the absorption spectrum, including its splitting due to the dynamic Stark effect, can be examined similarly. In some examples, the optical NN is configured to set a frequency, phase curve, and/or amplitude of the electromagnetic radiation based on the sensor data. The sensor data represent input information, such as pixel values of a camera image, local values of radar data, and/or local values of LIDAR data. By appropriately selecting the applied external electromagnetic field, the optical neurons of the input layer can be predefined in a sensor data-specific manner.

Furthermore, it can be assumed that the phase curve of the electromagnetic field can be measured during the temporal progression of the applied external electromagnetic field if detected quickly enough. This allows measurement of parameters such as the frequency of the electromagnetic field, phase curve, and amplitude curve. When the radiation source is activated, the generated electromagnetic field can serve as an additional optical weight for the optical NN.

At least one of the following options can be selected for the optical weight: modulation of the amplitude, phase, and/or frequency by a corresponding modulator for monitoring the probe laser and/or pump laser, and/or selection of the externally irradiated electromagnetic radiation, such as in the gigahertz range. Selecting the externally irradiated electromagnetic radiation in the gigahertz range modulates the absorption spectrum, thereby modulating the transmitted part of the probe laser to act as a weight.

In some examples, the control device comprises a processor unit, such as a computer and/or a graphics processor, and a further conversion device. The processor unit is configured to provide electronically coded sensor data, which can be received from a control device of a sensor device in the motor vehicle. The processor unit may include at least one microprocessor, microcontroller, field-programmable gate array (FPGA), and/or digital signal processor (DSP). The further conversion device is configured to convert the electronically coded sensor data into optically coded sensor data and provide them. Thus, the control device can receive electronically coded sensor data and convert them into optically coded sensor data for further evaluation by the optical NN. This means that optically coded sensor data do not need to be available from the outset for evaluation by the optical NN.

In some examples, the conversion device of the control device is configured to interfere local oscillator information, provided by a local oscillator, with the optically coded classification information to provide the electronically coded classification information. The local oscillator, also known as a local signal oscillator, enables a reliable method to convert optically coded classification information into electronically coded classification information. This information can then be provided to the processor device for automated or semi-automated driving functions or driver assistance systems for further evaluation or consideration.

In some examples, the optical NN is arranged on at least one chip. The chip can be one of the following components: an electronic and photonic cointegrated semiconductor chip (also known as an electronic and photonic integrated semiconductor chip), a photonic integrated circuit (IC), a multichip module, and/or a chip mounted by flip chip assembly. These basic modules or elements allow for an easy and cost-effective production of the optical NN, using commercially available components.

In some examples, the control device comprises a communication interface to a control unit of a sensor device in the motor vehicle. The control device is configured to receive sensor data detected by the sensor device via the communication interface. The sensor device can be a camera, radar device, and/or LIDAR device. The control unit controls the sensor device, for example, by activating or deactivating it, and/or defining a detection parameter for the sensor data. The control unit includes a microprocessor and/or microcontroller. The sensor data are detected in the motor vehicle and directly evaluated by the control device using the optical NN. The evaluated data, in the form of electronically coded classification information, are then used in the motor vehicle, for example, by the processor device. This allows the motor vehicle to benefit from the rapid classification of sensor data using the optical NN without needing a connection to an external device.

FIG. 1 illustrates a schematic side view of a motor vehicle 1. The motor vehicle 1 comprises a control device 2 and multiple sensor devices 3. Each of the sensor devices 3 comprises a control unit 4, which controls the respective sensor device 3 by activating or deactivating it. The control unit 4 can store sensor data and/or define a setting parameter for detecting sensor data by the sensor device 3, such as the resolution of the sensor data The sensor device 3 can be configured as a camera 5, here a side camera, a radar device 6, or a LIDAR device 7. In a vertical direction of the motor vehicle 1, the LIDAR device 7 is arranged at the top, and the radar devices 6 are arranged at the bottom.

The motor vehicle 1 has multiple optical fiber connections 8 through which the respective control unit 4 is connected to the control device 2. It may be provided that the optical fiber connection 8 connects the control unit 4, such as a communication interface 38 (see reference numeral 38 in FIG. 14) of the control unit 4, to the communication interface 38 of the control device 2. The respective control unit 4 can transmit the sensor data detected by the sensor device 3 to the control device 2 via the optical fiber connection 8.

Figure 2:
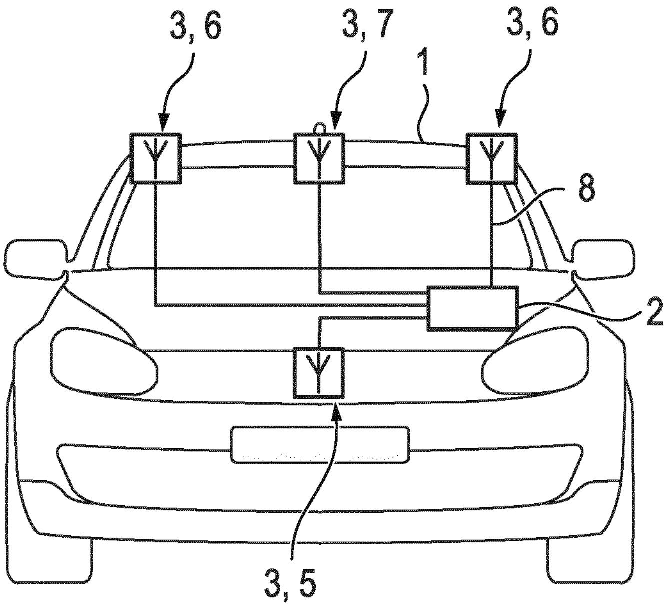
FIG. 2 shows a schematic front view of a motor vehicle comprising a control device and multiple sensor devices, according to some aspects of the present disclosure.

FIG. 2 shows a schematic front view of the motor vehicle 1 from FIG. 1. The LIDAR device 7 is centrally arranged at the top in the vertical direction of the motor vehicle 1, and the radar devices 6 are arranged laterally from the LIDAR device 7 at the top, where 'central' and 'lateral' refer to the transverse direction of the motor vehicle 1. The camera 5 is arranged at the bottom in the vertical direction.

Figure 3:
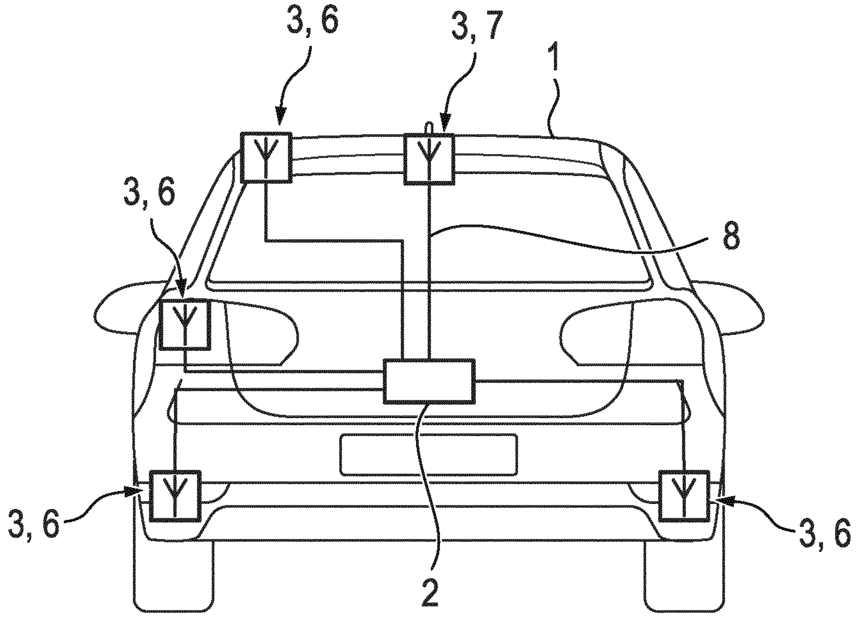
FIG. 3 shows a schematic rear view of a motor vehicle comprising a control device and multiple sensor devices, according to some aspects of the present disclosure.

FIG. 3 shows a schematic rear view of the motor vehicle 1 from FIGS. 1 and 2. The LIDAR device 7 is centrally arranged at the top in the vertical and transverse direction of the motor vehicle 1. Three radar devices 6 are arranged on top of each other in the vertical direction, but only on one side in the transverse direction, specifically the left side. In addition, a radar device 6 is arranged at the bottom in the vertical direction and on the right in the transverse direction.

The positions of the sensor devices 3 shown in FIGS. 1 to 3 should be understood as examples only. Alternative positions of the sensor devices 3 in the motor vehicle 1 that are not shown here are possible.

Figure 4:
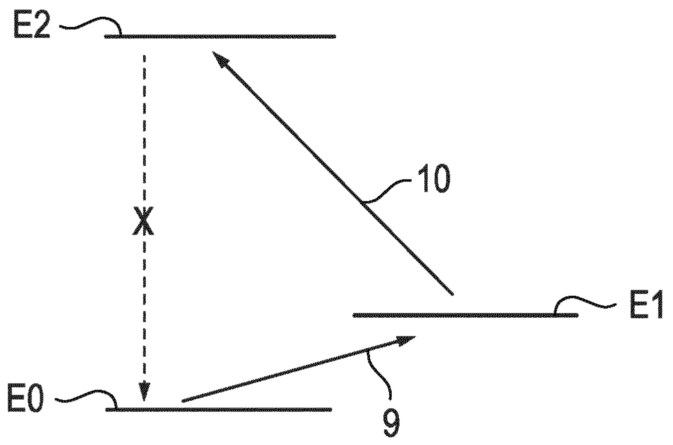
FIG. 4 shows a schematic representation of energy states with electromagnetically induced transparency, according to some aspects of the present disclosure.

FIG. 4 schematically shows the effect of electromagnetically induced transparency (EIT). This effect is based on a probe laser beam 9 being irradiated by a probe laser 29 (see reference numeral 29 in FIG. 13), and a coupling laser beam 10 being irradiated by a coupling laser 30 (see reference numeral 30 in FIG. 13) onto a non-linear optical medium 17 (see reference numeral 17 in FIG. 9), which can also be referred to as an atomic system. The non-linear optical medium 17 has the energy states E0, E1, and E2, which can alternatively be referred to as energy levels. By applying the probe laser beam 9 to the non-linear optical medium 17, at least one electron of an atom of the non-linear optical medium 17 in the energy state E0 can be raised to the energy state E1. By applying the coupling laser beam 10, the electron can be further raised from the energy state E1 to the energy state E2. In other words, the coupling laser 30 couples the energy states E1 and E2, which can be referred to as "coupled states" or "dressed states." The electron of the atom can thus transition from the energy state E0 to the energy state E2 by absorbing a photon of the probe laser 29 and a photon of the coupling laser 30. The state E2 is preferably long-lived, such as a metastable state. In this case, the non-linear optical medium 17 becomes transparent to the probe laser when there are no electrons of the non-linear optical medium 17 that can still absorb a photon of the probe laser beam 9 because they have not previously done so, and the transition from the energy state E2 to the energy state E0 is forbidden. The forbidden transition can be referred to as the "dark state" and is illustrated by a crossed-out arrow in FIG. 4. As a result, there is no repopulation of energy state E0 possible.

The motor vehicle 1 has multiple optical fiber connections 8 via which the respective control unit 4 is connected to the control device 2. It may be provided that the optical fiber connection 8 connects the control unit 4, for example a communication interface 38 (see reference numeral 38 in FIG. 14) of the control unit 4, to the communication interface 38 of the control device 2. The respective control unit 4 can be designed to transmit the sensor data detected by means of the sensor device 3 to the control device 2 via the optical fiber connection 8.

Figure 5:
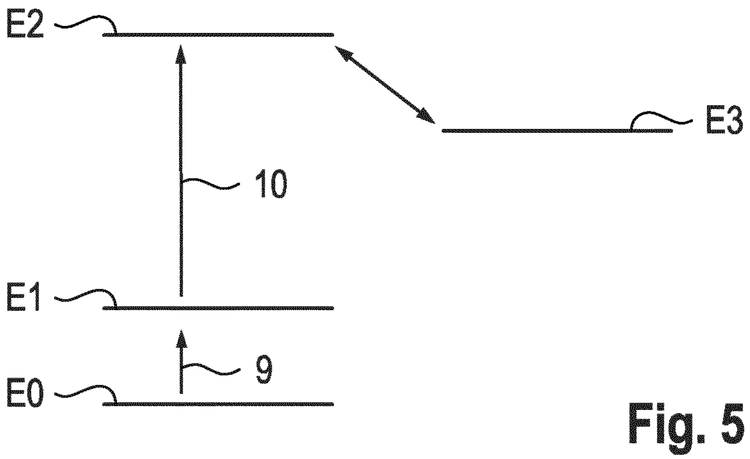
FIG. 5 shows a schematic representation of the energy states according to FIG. 4 in an external electromagnetic field, according to some aspects of the present disclosure.

FIG. 5 shows the energy states E0, E1, and E2 of the non-linear optical medium 17 from FIG. 4, with an additional external electromagnetic field now being irradiated. The non-linear optical medium 17 is thus irradiated with electromagnetic radiation 27 (refer to reference numeral 27 in FIG. 12) from the radiation source 26 (refer to reference numeral 26 in FIG. 12). The electromagnetic radiation 27 typically falls within the millimeter range and can have a frequency of 70 gigahertz, for example. As a result of the electromagnetic radiation 27, the energy state E2 is shifted to an energy state E3. This is known as the dynamic Stark effect, also referred to as the AC Stark effect or the Autler-Townes effect.

When the non-linear optical medium 17 is irradiated with the probe laser 29 and the coupling laser 30, a minimum is formed in the absorption spectrum of the probe laser beam 9 as soon as the laser irradiation time and/or intensity exceeds the predefined minimum time and/or intensity for the non-linear optical medium 17 being used. In this case, photons of the probe laser 29 can pass through the non-linear optical medium 17 without interaction, meaning they can propagate through the medium without any interaction. This state of the non-linear optical medium 17 can be detected by analyzing the absorption spectrum of the probe laser 29. Alternatively or additionally, the transmitted power of the probe laser beam 9 can be directly measured.

Figure 6:
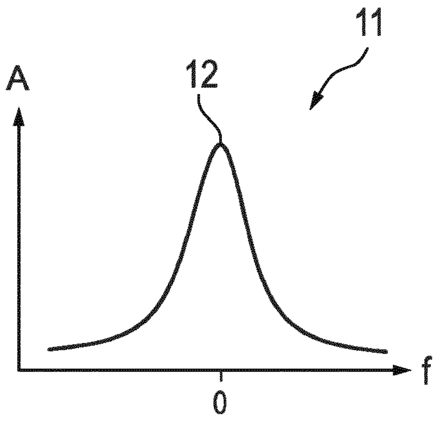
FIG. 6 shows a schematic representation of an absorption spectrum with electromagnetically induced transparency, according to some aspects of the present disclosure.

The absorption spectrum 11, which represents the absorbed power of the probe laser beam 9 as a function of the frequency f, is illustrated in FIG. 6. The absorption spectrum 11 was obtained without activating the radiation source 26. The absorption spectrum 11 has a singlet structure as a function of the frequency f around the central frequency f=0. It reaches its maximum at the central frequency f=0, where it has an extreme value 12. Therefore, the absorbed radiation of the probe laser beam 9 is maximal at the central frequency f=0

Figure 7:
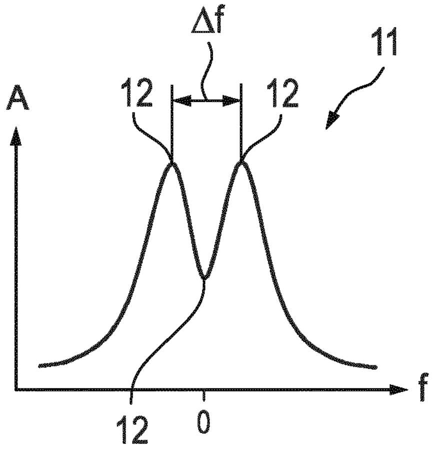
FIG. 7 shows a schematic representation of an absorption spectrum according to FIG. 4 in an external electromagnetic field, according to some aspects of the present disclosure.

FIG. 7 illustrates the absorption spectrum 11 when the radiation source 26 is activated. This causes the absorption spectrum 11 to split in the frequency domain as a function of the frequency f, forming a minimum around the probe laser wavelength. This phenomenon is known as "spectral splitting." In the energy state E3 excited by the external electromagnetic radiation 27, the resonance frequency shifts, resulting in the spectral splitting around the central frequency f=0. The amplitude of the transmitted radiation decreases. By performing a time-resolved measurement of the absorption spectrum 11, the phase of the incident probe laser radiation can be reconstructed. The minimum in the absorption spectrum provides information about the frequency f of the external field, i.e., the radiation source 26, based on the previously defined atomic transition to the energy state E3.

A width of the spectral splitting is plotted here as a frequency separation Δf between the two maximum extreme values 12 in the absorption spectrum 11. The frequency separation Δf can be calculated using the following formula:

$$\Delta f = \frac{|E|}{2\pi h} D \frac{\lambda_2}{\lambda_1}$$

Here, E denotes the electric field strength of the external electromagnetic field achieved by the electromagnetic radiation 27; D denotes an atomic dipole moment for the transition of the energy state E2 to the energy state E3 induced by the electromagnetic radiation 27; λ1 is a wavelength of the probe laser 29; and λ2 is the wavelength of the coupling laser 30. The formula furthermore contains π for the number Pi, and ℏ for the reduced Planck's constant.

Here, E denotes the electric field strength (denote) of the external electromagnetic field created by the electromagnetic radiation 27; D denotes an atomic dipole moment for the transition of the energy state E2 to the energy state E3 induced (caused) by the electromagnetic radiation 27; λ1 is a wavelength of the probe laser 29; and λ2 is the wavelength of the coupling laser 30. The formula furthermore contains p for the number Pi, and ℏ for the reduced Planck's constant.

During a temporal progression (as the electromagnetic field progresses) of the electromagnetic field through the electromagnetic radiation 27, a phase curve of the electromagnetic field can be measured if the electromagnetic field is detected sufficiently quickly. This yields the option of measuring the following additional parameters: the frequency f of the electromagnetic field when compared to a known spectral line (for example, an integrated optical frequency comb on a semiconductor basis), a phase curve of the electromagnetic field, and an amplitude curve of the electromagnetic field. When the radiation source 26 is activated, the electromagnetic field generated thereby can be utilized as an additional optical weight for the optical neural network (NN) 14 (see reference numeral 14 in FIG. 9).

Figure 8:
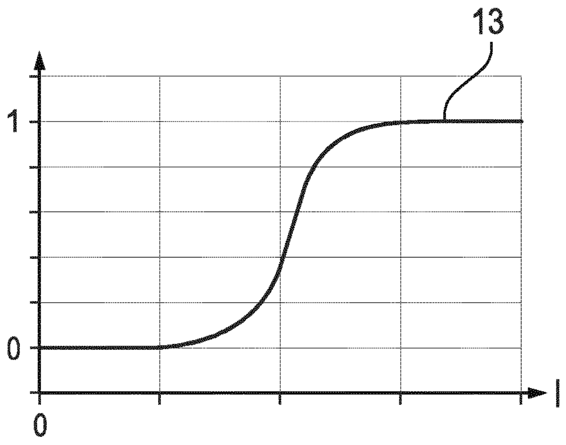
FIG. 8 shows a schematic representation of an EIT signal as a function of an intensity of a coupling laser, according to some aspects of the present disclosure.

FIG. 8 illustrates an EIT signal 13 based on the intensity I of the coupling laser 30. This function resembles a sigmoid function, that is, the function which is frequently used as a non-linear function of an optical neuron 16 (see reference numeral 16 in FIG. 9) within the NN 14. FIG. 8 thus illustrates that the transmission induced by the coupling laser 30 can be detected as a non-linear function similar to the sigmoid function, while the coupling laser 30 acts as an optical weight. When switched off, the coupling laser 30 can maximize the absorption thereof by the non-linear optical medium 17, which corresponds to the weight. It is furthermore possible to use a pump laser to induce a Rabi oscillation by the probe laser, which can likewise act as a weight. The intensity I or frequency detuning of the coupling laser 30 determines the strength of the EIT signal 13.

Furthermore, an optical weight can be implemented by modulating the amplitude, phase, and/or frequency f using a corresponding modulator to monitor the probe laser 29 and/or a pump laser for the probe laser 29.

Figure 9:
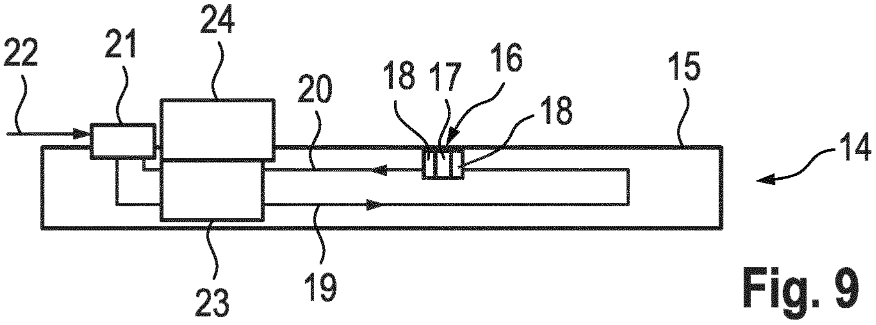
FIG. 9 shows a schematic representation of an optical neuron according to, according to some aspects of the present disclosure.

FIG. 9 shows a first exemplary embodiment of an optical neuron 16 for the optical NN 14, with only one neuron 16 illustrated here as an example. The optical neuron 16 is based on an EIT cell on a chip 15, which is schematically shown as an electronic and photonic cointegrated semiconductor chip (EPIC) in this example. However, the chip 15 can alternatively be designed as a photonic integrated circuit, as a multi-chip module, and/or as a chip mounted by means of flip chip assembly. The optical neuron 16 includes the non-linear optical medium 17, which is designed as a quantum dot (made of InAs or GaAs), a quantum wire, or a quantum well.

The non-linear optical medium 17, which can be a quantum dot, quantum wire, or quantum well, is equipped with an optional reflective coating 18 on its two outer sides.

Toward the optical neuron 16, there is at least one first optical waveguide 19, which allows the coupling of the probe laser beam 9 from the probe laser 29 and the coupling laser beam 10 from the coupling laser 30 into the optical neuron 16. Additionally, there is at least one second optical waveguide 20 leading away from the optical neuron 16. Furthermore, an optocoupler 21 is shown, which enables the coupling of a light wave feed guide 22 into the first optical waveguide 19. The first and second optical waveguides 19 and 20 are both arranged on the chip 15, starting from and up to the optocoupler 21.

Optionally, an optical modulator 23 can be placed on the chip 15. Moreover, the chip 15 can house an electronic circuit designed for diagnosis, for example. This electronic circuit serves as the evaluation device 24 for the optical NN 14. The second optical waveguide 20 directly leads to the evaluation device 24. Once the probe laser beam 9 passes through the optical neuron 16, it can be coupled into the second optical waveguide 20.

In other words, FIG. 9 shows that the first optical waveguide 19 couples the radiation of the probe laser 29 and the coupling laser 30, including the data to be processed (which may be the sensor data of the sensor device 3), into a photonic semiconductor represented by the chip 15. This radiation is guided through integrated photonic structures to the non-linear optical medium 17. The probe laser beam 9 and the coupling laser beam 10, or the laser radiation, interact with the non-linear optical medium 17, creating the above-described EIT. The frequency and/or amplitude information of the transmission spectrum and/or absorption spectrum 11 is then transmitted via the second optical waveguide 20 to the next layer of optical neurons 16 (not shown here), before being transmitted to the evaluation device 24 for diagnosis and control. Optionally, the optical modulator 23 can also be integrated to influence the amplitude, polarization, frequency, or phase, which can be used for data transmission to the evaluation device 24. Multiple EIT cells shown in FIG. 9 can be joined on an electronic and photonic co-integrated chip to form an optical NN 14.

Figure 10:
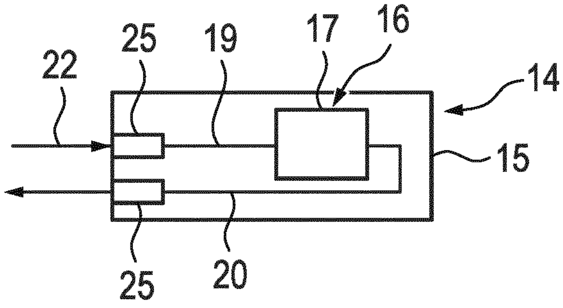
FIG. 10 shows a schematic representation of an optical neuron, according to some aspects of the present disclosure.

FIG. 10 shows a second exemplary embodiment where the integration of the EIT cell is carried out on a purely photonic chip, without the use of electronic components. In this embodiment, the non-linear optical medium 17 is designed as a vapor cell. This vapor cell contains at least one atom and/or molecule with a predefined energy level, such as a Rydberg atom and/or a Bose-Einstein condensate. FIG. 10 presents a simplified optical neuron 16 based on the photonic chip. Instead of the optocoupler 21, a photonic coupler 25 is placed at the inlet of the first optical waveguide 19 and at the outlet of the second optical waveguide 20. The first optical waveguide 19 couples the probe laser beam 9 and the coupling laser beam 10 back into the photonic chip, guiding them to the integrated EIT cell, which is the non-linear optical medium 17. The coupling laser 30 and the probe laser 29 interact with the non-linear optical medium 17 within the vapor cell (also known as a gas cell), creating the aforementioned EIT. This occurs specifically when an external electromagnetic field (not shown here) interacts with the non-linear optical medium 17. The frequency and/or amplitude information is then transmitted back via the second optical waveguide 20 to a central data processing module, such as the evaluation device 24, where it is optically detected.

Figure 11:
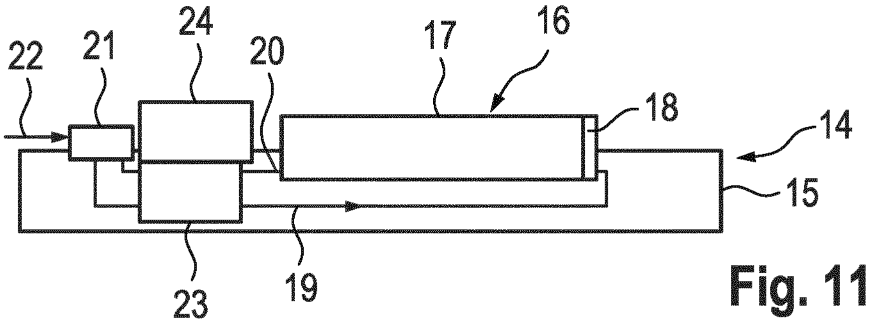
FIG. 11 shows a schematic representation of an optical neuron, according to some aspects of the present disclosure.

FIG. 11 shows a third exemplary embodiment, which can be referred to as a highly integrated design including an EIT cell that uses a vapor cell/Bose-Einstein condensate as the non-linear optical medium 17. In other words, FIG. 11 shows a schematic representation of an optical neuron 16 based on an EIT cell on an EPIC (electronic and photonic integrated semiconductor chip). The first optical waveguide 19 couples coherent radiation into a photonic semiconductor and leads to an integrated vapor cell/Bose-Einstein condensate. The coupling laser 30 and the probe laser 29 interact with the non-linear optical medium 17 within the EIT cell to create the aforementioned EIT. Optionally, additional optical modulators 23 can be integrated to influence the amplitude, polarization, frequency, or phase, which can also be used for data transmission to the evaluation device 24.

The optical weight of the optical NN 14 can be achieved by selecting the externally irradiated electromagnetic radiation 27, for example in the gigahertz range. By modulating the absorption spectrum 11 in such a way that the transmitted part of the probe laser 29 is modulated, it acts as a weight.

Figure 12:
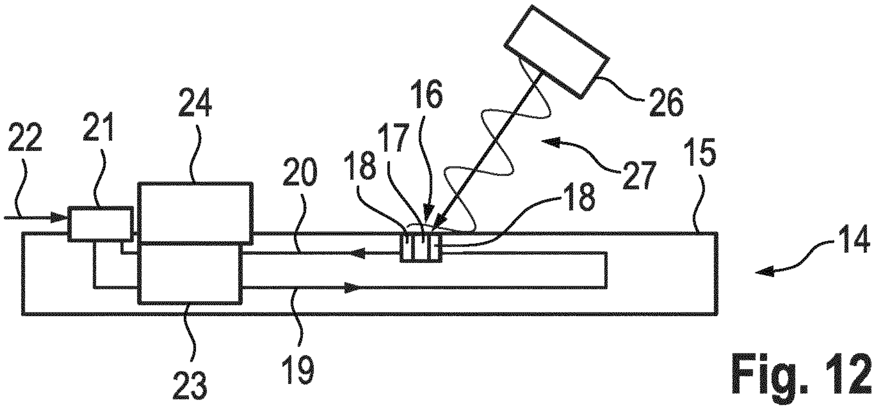
FIG. 12 shows a schematic representation of an optical neuron according to some aspects of the present disclosure.

FIG. 12 shows a fourth exemplary embodiment, in which the non-linear optical medium 17 can be designed as a quantum dot, quantum wire, and/or quantum well, for example as an InAs/GaAs quantum dot. This embodiment utilizes external radiation sources 26 as optical weights, where electromagnetic radiation 27 is irradiated onto the optical neuron 16 through an external radiation source 26. The chip 15 can be designed similarly to FIG. 9. The optical NN 14 is designed to set the frequency, phase curve, and/or amplitude of the electromagnetic radiation 27 based on the sensor data.

In FIGS. 9 to 12, the first optical waveguide 19 and the second optical waveguide 20 can be interchanged with one another.

Figure 13:
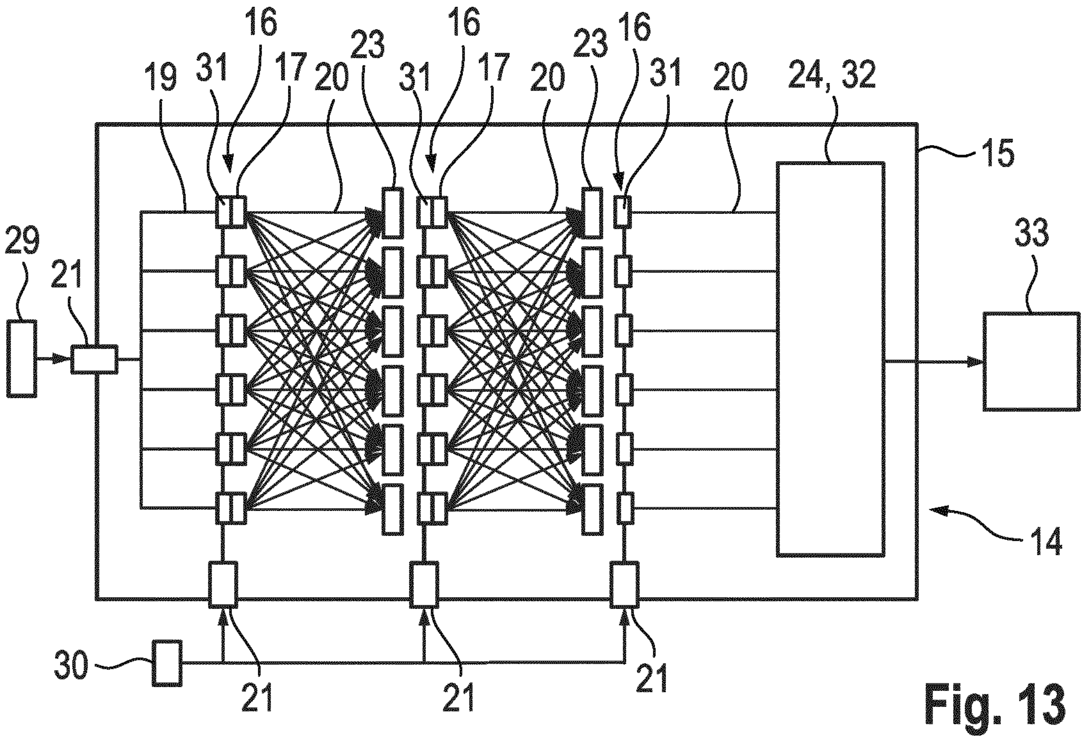
FIG. 13 shows a schematic representation of an optical neural network, according to some aspects of the present disclosure.

FIG. 13, by way of example, shows the optical NN 14 with multiple optical neurons 16, specifically integrated on a photonic and electronic co-integrated chip. The probe laser 29 is shown here, which couples the probe laser beam 9 into multiple first optical waveguides 19 via the optocoupler 21. Additionally, the coupling laser 30 is depicted, which couples the coupling laser beam 10 into parallel layers of optical neurons 16 using multiple optocouplers 21. The optocoupler 21 can be designed to perform wavelength division multiplexing and/or time division multiplexing to encode the image information, in other words, the optically coded sensor data, in the wavelength, enabling weight provision through the coupling laser 30. Alternatively, multiple channels can be used to achieve weight provision through the coupling laser 30. Similarly to FIG. 9, the optical neurons here are exemplified as quantum dots, quantum wires, and/or quantum well.

Furthermore, FIG. 13 displays multiple optical weights 31 assigned to each optical neuron 16 of the depicted optical NN 14. In addition to the evaluation device 24, the optical NN 14 can include a conversion device 32, in addition to the evaluation device 24. The combination of the evaluation device 24 and conversion device 32 can be referred to as an electro-optical interface or electronic data processing unit, performing these functions. Together, the evaluation device 24 and conversion device 32 provide electronically coded classification information 33, electronically describing the classification of the sensor data. FIG. 13 also illustrates that the second optical waveguide 20 connects each optical neuron 16 of one layer to each optical neuron 16 of the neighboring layer. Alternatively, only selected optical neurons 16 of a layer can be connected to selected optical neurons 16 of the adjacent layer through the relevant second optical waveguide 20.

Figure 14:
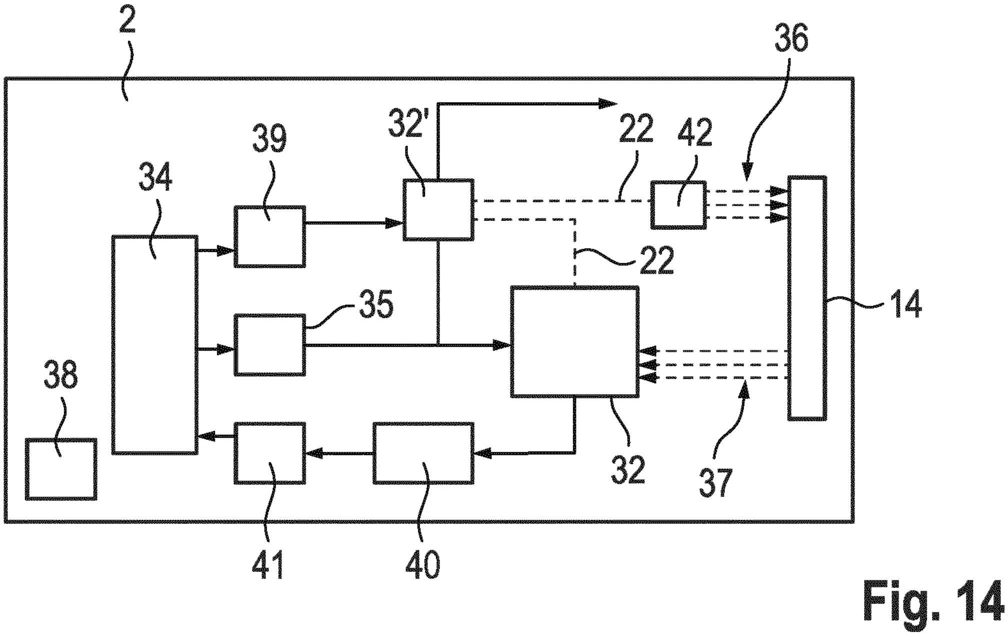
FIG. 14 shows a schematic representation of a control device comprising an optical neural network, according to some aspects of the present disclosure.

FIG. 14 illustrates a detailed view of the control device 2. The control device 2 includes, for instance, a processor unit 34, such as a computer and/or a graphics processor. The processor unit 34 is designed to generate electronically coded sensor data. Additionally, a further conversion device 32' within the control device 2 can convert the generated electronically coded sensor data into optically coded sensor data 36 and provide them. This means that the control device 2 is capable of supplying optically coded sensor data 36 for the optical NN 14.

The control device 2 is designed to evaluate the provided sensor data 36 using an optical NN 14, which consists of multiple optical neurons 16 with electromagnetically induced transparency characteristics. The evaluation results are then used to generate optically coded classification information 37. This classification information is in the form of an optical signal or optical data.

The conversion device 32 in the control device 2 interferes with the optically coded classification information 37 along with local oscillator information from a local oscillator 35. This interference generates electronically coded classification information 33. The control device 2 converts the optically coded classification information 37 into electronically coded classification information 33 using the conversion device 32. This electronically coded information is then provided for the motor vehicle 1. A phase lock can be used instead of or in addition to the local oscillator 35

The control device 2 can also have a communication interface 38 through which sensor data can be received from control units 4 of sensor devices 3.

Additional features of the control device 2 include a diagnosis and/or monitoring interface 39, a digital interface 40, a processing unit 41 (optional), which can perform a Fast Fourier transform for processing the electronically coded classification information 33, and an optical switch 42. The conversion device 32 can be designed for optical detection, homodyne or heterodyne detection, and/or down conversion of the frequency. Alternatively, the probe laser 29 and the coupling laser 30 can be positioned at the location of the additional conversion device 32'. This device 32' can include an optical frequency comb and/or a microring resonator.

In FIG. 14, solid lines represent transmission paths for electronically coded data, while dotted lines represent transmission paths for optically coded data. Additionally, there can be an electronic transmission path to the neurons 16, depicted as an arrow originating from the further conversion device 32' without an endpoint.

The control device shown in FIG. 14, or control device 2, enables several functions, including the combined processing of data in a spatially separate central unit, coherent processing, the integration of optical frequency combs for wideband sampling of external electromagnetic field frequencies, and the integration of the local oscillator 35 or a phase coupling unit. These functions allow for the electronic or optical connection of neurons 16 in a phase-locked manner and the utilization of these neurons for frequency mixing in the detector.

The classification of data in the 5G frequency band or beyond can furthermore be carried for: data processing for vehicle-to-infrastructure applications (software updates, map updates, infrastructure signals), gesture recognition and/or user interface applications.

Overall, the examples show the use of EIT as an optical neuron 16 in artificial optical NN 14.

List of Reference Signs

| | |
|---|---|
| 1 | motor vehicle |
| 2 | control device |
| 3 | sensor device |
| 4 | control unit |
| 5 | camera |
| 6 | radar device |
| 7 | LIDAR device |
| 8 | optical fiber connection |
| 9 | probe laser beam |
| 10 | coupling laser beam |
| 11 | absorption spectrum |
| 12 | extreme value |
| 13 | EIT signal |
| 14 | optical neural network |
| 15 | chip |
| 16 | optical neuron |
| 17 | non-linear optical medium |
| 18 | coating |
| 19 | first optical waveguide |
| 20 | second optical waveguide |
| 21 | optocoupler |
| 22 | light wave feed guide |
| 23 | optical modulator |
| 24 | evaluation device |
| 25 | photonic coupler |
| 26 | radiation source |
| 27 | electromagnetic radiation |
| 29 | probe laser |
| 30 | coupling laser |
| 31 | optical weight |
| 32 | conversion device |
| 32' | further conversion device |
| 33 | electronically coded classification information |
| 34 | processor unit |
| 35 | local oscillator |
| 36 | optically coded sensor data |
| 37 | optically coded classification information |
| 38 | communication interface |
| 39 | diagnosis and/or monitoring interface |
| 40 | digital interface |
| 41 | processing unit |
| 42 | optical switch |
| E0-E3 | energy state |
| f | frequency |
| Δf | frequency separation |
| I | intensity |

The invention claimed is:

1. A control device for providing a classification of sensor data for a motor vehicle, the control device comprising:

an optical neural network configured to evaluate optically coded sensor data, the optical neural network comprising a plurality of optical neurons having electromagnetically induced transparency characteristics, wherein the optical neural network is configured to set at least one of a frequency or a wavelength of at least one of a probe laser or a coupling laser based on the optically coded sensor data, and to evaluate at least one of an absorption spectrum or a transmission spectrum of a probe laser beam after passing through at least one of the optical neurons, and, as a result of the evaluation by means of an evaluation device of the optical neural network, to provide optically coded classification information describing the classification of the sensor data;

a conversion device configured to convert the optically coded classification information into electronically coded classification information; and the control device configured to provide the electronically coded classification information for the motor vehicle.

2. The control device according to claim 1, wherein at least one of the optical neurons comprises a non-linear optical medium, comprising a quantum dot, quantum wire, quantum well, and/or vapor cell, with at least one atom or molecule having a predefined energy level.

3. The control device according to claim 1, wherein the optical neural network comprises:

at least one layer with a plurality of optical neurons;

at least one first optical waveguide configured to couple a probe laser beam and a coupling laser beam into each optical neuron; and at least one second optical waveguide configured to couple the probe laser beam away from each optical neuron to another optical neuron or directly to the evaluation device after passing through the optical neuron.

4. The control device according to claim 3, wherein the evaluation of the absorption spectrum or the transmission spectrum comprises evaluating at least one of a frequency, an amplitude, or a phase of the absorption spectrum or the transmission spectrum.

5. The control device according to claim 3, wherein the optical neural network comprises at least one optical modulator, which is configured to influence at least one property of the probe laser beam, including an amplitude, a polarization, a frequency, a wavelength, and/or a phase of the probe laser beam.

6. The control device according to claim 3, wherein the optical neural network comprises a radiation source, which is configured to irradiate the at least one optical neuron with electromagnetic radiation so that the absorption spectrum and/or the transmission spectrum of the probe laser beam that is coupled into the at least one second optical waveguide undergoes splitting utilizing the dynamic Stark effect, and wherein the optical neural network is configured to evaluate the split absorption spectrum and/or transmission spectrum for providing the optically coded classification information.

7. The control device according to claim 6, wherein the optical neural network is configured to set a frequency, a phase curve, and/or an amplitude of the electromagnetic radiation, based on the sensor data.

8. The control device according to claim 1, wherein the control device comprises a processor unit, including a computer and/or a graphics processor, and a further conversion device, the processor unit being configured to provide electronically coded sensor data, and the further conversion device being configured to convert the provided electronically coded sensor data into the optically coded sensor data and to provide these.

9. The control device according to claim 1, wherein the conversion device is configured to interfere local oscillator information, which is provided by a local oscillator, with the provided optically coded classification information so as to provide the electronically coded classification information.

10. The control device according to claim 1, wherein the optical neural network is arranged on at least one chip, which is designed as at least one of the following components:

an electronic and photonic cointegrated semiconductor chip;

a photonic integrated circuit;

a multi-chip module; and/or a chip mounted by means of flip chip assembly.

11. The control device according to claim 1, wherein the control device comprises a communication interface to a control unit of a sensor device of the motor vehicle and is configured to receive sensor data detected by means of the sensor device via the communication interface.

12. A method for providing a classification of sensor data for a motor vehicle, the method comprising:

evaluating optically coded sensor data using an optical neural network, the optical neural network comprising a plurality of optical neurons having electromagnetically induced transparency characteristics;

setting at least one of a frequency or a wavelength of at least one of a probe laser or a coupling laser based on the optically coded sensor data;

evaluating at least one of an absorption spectrum or a transmission spectrum of a probe laser beam after passing through at least one of the optical neurons;

providing optically coded classification information describing the classification of the sensor data as a result of the evaluation by means of an evaluation device of the optical neural network;

converting the optically coded classification information into electronically coded classification information using a conversion device; and providing the electronically coded classification information for the motor vehicle.

13. The method according to claim 12, further comprising using a non-linear optical medium, comprising at least one of a quantum dot, quantum wire, quantum well, and/or vapor cell, with at least one atom or molecule having a predefined energy level, to facilitate evaluation of the optically coded sensor data by at least one of the optical neurons.

14. The method according to claim 12, further comprising:

coupling a probe laser beam and a coupling laser beam into each optical neuron via at least one first optical waveguide; and coupling the probe laser beam away from each optical neuron to another optical neuron or directly to the evaluation device via at least one second optical waveguide after passing through the optical neuron.

15. The method according to claim 14, wherein evaluating the absorption spectrum or the transmission spectrum comprises evaluating at least one of a frequency, an amplitude, or a phase of the absorption spectrum or the transmission spectrum.

16. The method according to claim 14, further comprising influencing at least one property of the probe laser beam, using at least one optical modulator, wherein the at least one property comprises at least one of an amplitude, polarization, frequency, wavelength, or phase of the probe laser beam.

17. The method according to claim 14, further comprising:

irradiating at least one of the optical neuron with electromagnetic radiation to cause splitting of the absorption spectrum and/or transmission spectrum of the probe laser beam that is coupled into the at least one second optical waveguide utilizing the dynamic Stark effect; and evaluating the split absorption spectrum and/or transmission spectrum to provide the optically coded classification information.

18. The method according to claim 17, further comprising setting at least one of a frequency, a phase curve, and/or an amplitude of the electromagnetic radiation based on the sensor data.

19. The method according to claim 12, further comprising interfering local oscillator information, which is provided by a local oscillator, with the optically coded classification information to provide the electronically coded classification information.

20. A vehicle, comprising:

a control device for providing a classification of sensor data for the vehicle, the control device comprising:

an optical neural network configured to evaluate optically coded sensor data, the optical neural network comprising a plurality of optical neurons having electromagnetically induced transparency characteristics, wherein the optical neural network is configured to set at least one of a frequency or a wavelength of at least one of a probe laser or a coupling laser based on the optically coded sensor data, and to evaluate at least one of an absorption spectrum or a transmission spectrum of a probe laser beam after passing through at least one of the optical neurons, and, as a result of the evaluation by means of an evaluation device of the optical neural network, to provide optically coded classification information describing the classification of the sensor data;

a conversion device configured to convert the optically coded classification information into electronically coded classification information; and the control device configured to provide the electronically coded classification information for the vehicle.

* * * * *